United States Patent
Kishi et al.

(10) Patent No.: US 9,246,192 B2
(45) Date of Patent: Jan. 26, 2016

(54) NONAQUEOUS ELECTROLYTE BATTERY AND BATTERY PACK

(75) Inventors: Takashi Kishi, Yokosuka (JP); Norio Takami, Yokohama (JP); Takuya Iwasaki, Uenohara (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 610 days.

(21) Appl. No.: 13/560,375

(22) Filed: Jul. 27, 2012

(65) Prior Publication Data

US 2013/0078530 A1    Mar. 28, 2013

(30) Foreign Application Priority Data

Sep. 26, 2011 (JP) ................................. 2011-209232

(51) Int. Cl.
| | |
|---|---|
| *H01M 10/0569* | (2010.01) |
| *H01M 2/16* | (2006.01) |
| *H01M 4/485* | (2010.01) |
| *H01M 4/505* | (2010.01) |
| *H01M 4/525* | (2010.01) |
| *H01M 10/0525* | (2010.01) |
| *H01M 2/02* | (2006.01) |
| *H01M 2/10* | (2006.01) |
| *H01M 4/1391* | (2010.01) |
| *H01M 10/42* | (2006.01) |
| *H01M 10/48* | (2006.01) |

(52) U.S. Cl.
CPC .......... *H01M 10/0569* (2013.01); *H01M 2/162* (2013.01); *H01M 2/1626* (2013.01); *H01M 4/485* (2013.01); *H01M 4/505* (2013.01); *H01M 4/525* (2013.01); *H01M 2/0277* (2013.01); *H01M 2/1061* (2013.01); *H01M 4/1391* (2013.01); *H01M 10/0525* (2013.01); *H01M 10/4257* (2013.01); *H01M 10/486* (2013.01); *H01M 2300/0037* (2013.01); *Y02E 60/122* (2013.01)

(58) Field of Classification Search
CPC . H01M 2/1606; H01M 2/162; H01M 2/1626; H01M 4/505; H01M 4/525; H01M 4/485; H01M 10/0525; H01M 10/0569; H01M 10/0567; H01M 2300/0037; Y02E 60/122
See application file for complete search history.

(56) References Cited

U.S. PATENT DOCUMENTS

| | | |
|---|---|---|
| 6,245,465 B1 | 6/2001 | Angell et al. |
| 7,601,463 B2 | 10/2009 | Inagaki et al. |
| 2006/0046155 A1 | 3/2006 | Inagaki et al. |
| 2008/0166637 A1 | 7/2008 | Inagaki et al. |
| 2008/0176142 A1 | 7/2008 | Inagaki et al. |
| 2012/0058379 A1 | 3/2012 | Kishi et al. |

FOREIGN PATENT DOCUMENTS

| | | | |
|---|---|---|---|
| CN | 1744368 A | | 3/2006 |
| JP | 2000-515672 | | 11/2000 |
| JP | 2001-243982 | * | 9/2001 |
| JP | 2001-243982 A | | 9/2001 |
| JP | 2005-63772 | | 3/2005 |
| JP | 2008-186803 | | 8/2008 |
| JP | 4245532 | | 1/2009 |
| JP | 2009-76468 | | 4/2009 |
| WO | 2011/089697 A1 | | 7/2011 |

OTHER PUBLICATIONS

Combined Office Action and Search Report issued Jun. 12, 2014, in Chinese Patent Application No. 201210269941.6 with English translation.
A. Abouimrane, et al., "Sulfone-based electrolytes for high-voltage Li-ion batteries", Electrochemistry Communications 11, 2009, 2 pages.
Kang Xu, et al., "Sulfone-Based Electrolytes for Lithium-Ion Batteries [Journal of The Electrochemical Society, 149, A920 (2002)]", Journal of The Electrochemical Society, 2002, 8 pages.
Chinese Office Action issued Apr. 22, 2015, in corresponding Chinese Patent Application No. 201210269941.6 (with English-language Translation).
Chinese Office Action issued Oct. 12, 2015, in corresponding Chinese Patent Application No. 201210269941.6 (with English-language Translation).

* cited by examiner

*Primary Examiner* — Laura Weiner (74) *Attorney, Agent, or Firm* — Oblon, McClelland, Maier & Neustadt, L.L.P (57) ABSTRACT

According to one embodiment, a nonaqueous electrolyte battery includes a nonaqueous electrolyte, a positive electrode, a negative electrode and a separator. The nonaqueous electrolyte includes an asymmetric sulfone-based compound and a symmetric sulfone-based compound. The positive electrode includes a composite oxide represented by $Li_{1-x}Mn_{1.5-y}Ni_{0.5-z}M_{y+z}O_4$ ($0 \leq x \leq 1$, $0 \leq y+z \leq 0.15$, and M is at least one kind of element selected from the group consisting of Mg, Al, Ti, Fe, Co, Ni, Cu, Zn, Ga, Nb, Sn, Zr and Ta). The negative electrode includes a Ti-containing oxide which is capable of absorbing and releasing lithium. The separator includes a nonwoven fabric.

18 Claims, 5 Drawing Sheets

NONAQUEOUS ELECTROLYTE BATTERY AND BATTERY PACK

CROSS-REFERENCE TO RELATED APPLICATIONS

This application is based upon and claims the benefit of priority from Japanese Patent Application No. 2011-209232, filed Sep. 26, 2011, the entire contents of which are incorporated herein by reference.

FIELD

Embodiments described herein relate generally to a nonaqueous electrolyte battery and a battery pack.

BACKGROUND

Among secondary batteries, nonaqueous electrolyte secondary batteries are secondary batteries that are charged and discharged by the transfer of lithium ions between positive and negative electrodes, and since the nonaqueous electrolyte secondary batteries use an organic solvent as an liquid electrolyte, they can provide a larger voltage than those provided by nickel-cadmium secondary batteries and nickel metal hydride secondary batteries that use an aqueous solution. In nonaqueous electrolyte secondary batteries that are practically used now, lithium-containing cobalt composite oxides and lithium-containing nickel composite oxides are used as positive electrode active materials, and carbon-based materials, lithium titanate and the like are used as negative electrode active materials. Furthermore, as a liquid electrolyte, those obtained by dissolving a lithium salt such as $LiPF_6$ and $LiBF_4$ in an organic solvent such as cyclic carbonates and chain carbonates are used.

The positive electrode active material has an average working potential of about from 3.4 to 3.8 V versus $Li/Li^+$, and the maximum potential during charging of from 4.1 to 4.3 V versus $Li/Li^+$. V versus $Li/Li^+$ is a unit of potential based on a metallic lithium potential. On the other hand, the carbon-based material and lithium titanate that are negative electrode active materials have average working potentials of about from 0.05 to 0.5 V and 1.55 V, respectively, versus $Li/Li^+$. By combining these positive and negative electrode active materials, the battery voltage becomes from 2.2 to 3.8 V, and the maximum charge voltage becomes from 2.7 to 4.3 V.

As a countermeasure for further improving a capacity, use of $LiMn_{1.5}Ni_{0.5}O_4$ having the maximum potential during charging of from 4.4 V to 5.0 V as a positive electrode active material is suggested. However, there was a problem that, when this positive electrode active material is used together with an electrolyte containing a carbonate-based solvent, the solvent causes an oxidation reaction at the positive electrode during charging, thereby the battery performance is deteriorated and generation of gas is caused. On the other hand, use of sultone- or sulfone-based compounds also as a solvent has been suggested. However, there are problems that sultone- and sulfone-based compounds have higher viscosity, provide lower solubility of lithium salts and have higher reactivity with a negative electrode as compared to carbonate-based solvents.

DETAILED DESCRIPTION

According to one embodiment, there is provided a nonaqueous electrolyte battery including a nonaqueous electrolyte, a positive electrode, a negative electrode and a separator. The nonaqueous electrolyte includes a nonaqueous solvent and a lithium salt that is dissolved in the nonaqueous solvent. The nonaqueous solvent contains an asymmetric sulfone-based compound represented by the formula 1 and a symmetric sulfone-based compound represented by the formula 2. The positive electrode includes a positive electrode active material containing a composite oxide represented by $Li_{1-x}Mn_{1.5-y}Ni_{0.5-z}M_{y+z}O_4$ ($0 \leq x \leq 1$, $0 \leq y+z \leq 0.15$, and M is at least one kind of element selected from the group consisting of Mg, Al, Ti, Fe, Co, Ni, Cu, Zn, Ga, Nb, Sn, Zr and Ta). The negative electrode includes a negative electrode active material containing a Ti-containing oxide which is capable of absorbing and releasing lithium. The separator is provided between the positive electrode and negative electrode, and includes a nonwoven fabric.

Formula 1 wherein $R_1 \neq R_2$, and $R_1$ and $R_2$ are each an alkyl group having 1 or more and 10 or less carbon atoms, and Formula 2

$R_3$ is an alkyl group having 1 or more and 6 or less carbon atoms.

Furthermore, according to one embodiment, a battery pack including the nonaqueous electrolyte battery according to the embodiment is provided.

The embodiments will be hereinafter explained with reference to drawings.

First Embodiment

According to the first embodiment, a nonaqueous electrolyte battery comprising a case, a positive electrode, a negative electrode, a separator and a nonaqueous electrolyte is pro- vided. The positive electrode, negative electrode, separator and nonaqueous electrolyte are housed in the case.

The nonaqueous electrolyte comprises a nonaqueous solvent and a lithium salt that is dissolved in the nonaqueous solvent. The nonaqueous solvent contains an asymmetric sulfone-based compound represented by the formula 1 and a symmetric sulfone-based compound represented by the formula 2.

Formula 1 wherein $R_1 \neq R_2$, and $R_1$ and $R_2$ are each an alkyl group having 1 or more and 10 or less carbon atoms, and Formula 2

$R_3$ is an alkyl group having 1 or more and 6 or less carbon atoms.

The positive electrode comprises a positive electrode active material containing a composite oxide represented by $Li_{1-x}Mn_{1.5-y}Ni_{0.5-z}M_{y+z}O_4$ ($0 \leq x \leq 1$, $0 \leq y+z \leq 0.15$, and M is at least one kind of element selected from the group consisting of Mg, Al, Ti, Fe, Co, Ni, Cu, Zn, Ga, Nb, Sn, Zr and Ta). The negative electrode comprises a negative electrode active material containing a Ti-containing oxide which is capable of absorbing and releasing lithium. The separator is disposed between the positive electrode and negative electrode.

The oxide used for the positive and negative electrode active materials is prepared by subjecting a plurality of kinds of carbonates and hydroxides as raw materials to a calcination process. Therefore, even raw materials in amounts that are required in principle are prepared, remaining of the raw materials cannot be avoided due to a bad process for mixing plural raw materials, an insufficient calcination period or the like. Furthermore, since a specific raw material is used in a larger amount than a stoichiometrically defined amount so as to increase a yield in many cases, remaining of the raw materials occurs. Furthermore, since the production and construction of electrodes are conducted in the air, adsorption of moisture or $CO_2$ is caused. Among these residual raw materials and adsorbed substances, hydroxides, carbonates, water and the like have a small electrochemical window, and thus they are decomposed when a voltage is applied to positive and negative electrodes, thereby gases such as hydrogen and carbon dioxide are generated. Since a 5 V positive electrode comprising the above-mentioned composite oxide has the maximum voltage during charging that is higher than that of a 4 V positive electrode, oxidation of residual raw materials and adsorbed substances occurs easily. Furthermore, since the above-mentioned oxide used for the negative electrode is not a carbon-based material that is calcined at a high temperature, remaining of the raw materials occurs easily and generation of gas due to reduction occurs easily.

By using the electrolyte and separator as mentioned above in a nonaqueous electrolyte battery equipped with such positive and negative electrodes at which generation of gas easily occurs, swelling due to generation of gas can be suppressed, and excellent output properties, specifically excellent rate properties and cycle properties, and a large charge capacity can be obtained. Since the compounds represented by the formulas 1 and 2 are difficult to be oxidized, a nonaqueous electrolyte battery having excellent output properties at a room temperature and a high temperature of about 60° C. can be constituted by using these compounds by mixing. Although a specific mechanism of improving properties is unclear, it is presumed that the amount of the sulfone group that is a polar group in a unit volume of the nonaqueous solvent increases by mixing the symmetric sulfone-based compound represented by the formula 2 which has a melting point at around a room temperature or more, thereby the solubility of the lithium salt in the nonaqueous solvent is increased. Furthermore, the symmetric sulfone-based compound is more advantageous than the asymmetric sulfone-based compound since the synthesis process therefor can be simplified.

Furthermore, simplification of the synthesis process is also effective in view of improvement of the purity of the symmetric sulfone-based compound.

Hereinafter the positive electrode, negative electrode, separator, nonaqueous electrolyte and case will be explained.

(Positive Electrode)

The positive electrode contains a positive electrode active material, and can also comprise a substance having electron conductivity (hereinafter referred to as a conductive material) and a binder. Furthermore, the positive electrode can comprise a current collector. The current collector contacts with a positive electrode material layer comprising the positive electrode active material. The positive electrode material layer can be obtained by, for example, kneading the positive electrode active material, conductive material and binder, and forming the kneaded product into a sheet by pressing. Alternatively, it is also possible to form the positive electrode material layer on the current collector by preparing a slurry by dissolving or suspending the positive electrode active material, conductive material and binder in a solvent such as toluene and N-methylpyrrolidone (NMP), and applying the slurry to the current collector and drying the slurry to form a sheet.

The positive electrode active material contains a composite oxide represented by $Li_{1-x}Mn_{1.5-y}Ni_{0.5-z}M_{y+z}O_4$ ($0 \leq x \leq 1$, $0 \leq y+z \leq 0.15$, and M is at least one kind of element selected from the group consisting of Mg, Al, Ti, Fe, Co, Ni, Cu, Zn, Ga, Nb, Sn, Zr and Ta). The molar ratio of Li (1-x) may vary in the range of $0 \leq x \leq 1$ by the absorption and release of lithium in accordance with a charge-discharge reaction. Although the substitution amount (y+z) may be zero, 0.01 or more is desirable in view of suppression of surface activity. Furthermore, it is desirable that the substitution amount (y+z) is 0.15 or less from the viewpoint of performance of high capacity. A more preferable range is 0.03 or more and 0.1 or less. Furthermore, by substituting a part of at least one of Mn and Ni with the element M, the surface activity of the positive electrode active material can be decreased, thereby increase in the battery resistance can further be suppressed. Specifically, it is desirable to use at least one of Mg and Zr as the element M since the substitution effect is high. From the viewpoints of cycle property and costs, it is desirable that the composite oxide is $LiMn_{1.5}Ni_{0.5}O_4$. The kind of the positive electrode active material as used can be one kind or two or more kinds.

Examples of the conductive material can include carbon materials and the like.

The binder includes at least one kind of polytetrafluoroethylene (PTFE), polyvinylidene fluoride (PVdF), ethylene-propylene-diene copolymers, styrene-butadiene rubbers or the like.

A base material having electron conductivity such as a metal can be used for the current collector. Specific examples of the current collector include metal foils, thin plates or meshes, metal meshes and the like of aluminum, stainless, titanium and the like.

In the case when the positive electrode material layer contains the positive electrode active material, conductive material and binder, the mixing ratios of the positive electrode active material, conductive material and binder are preferably 73 to 95% by weight of the positive electrode active material, 3 to 20% by weight of the conductive material and 2 to 7% by weight of the binder, with respect to 100% by weight of the positive electrode material layer.

It is desirable that the positive electrode is used so that the maximum potential during charging is in the range of from 4.4 to 4.9 V (vs. Li/Li$^+$). By adjusting the maximum potential during charging to be within such range, a large capacity can be obtained. Specifically, it is more desirable to use the positive electrode so that the maximum potential during charging becomes the range of 4.6 to 4.8 V (vs. Li/Li$^+$) since a large capacity and suppression of side reactions can be achieved simultaneously. Furthermore, it is desirable to use the positive electrode so that the lowest potential during discharging becomes the range of 4.0 to 4.3 V (vs. Li/Li$^+$) since the deterioration of the positive electrode active material can be minimized and higher cycle properties can be obtained.

(Negative Electrode)

The negative electrode contains a negative electrode active material, and can also comprise a conductive material and a binder. Furthermore, the negative electrode can comprise a current collector. The current collector is in contact with a negative electrode material layer comprising the negative electrode active material. The negative electrode material layer may be formed into a pellet form, a thin plate form or a sheet form. The negative electrode material layer is obtained by kneading the negative electrode active material, conductive material and binder, and pressing the kneaded product to form a pellet or sheet. Alternatively, the negative electrode material layer can be formed on the current collector by kneading the negative electrode active material, conductive material and binder, dissolving or suspending these in a solvent such as water and N-methylpyrrolidone (NMP) to prepare a slurry, and applying the slurry to the current collector and drying the slurry to form a sheet.

Examples of the Ti-containing oxide which is capable of absorbing and releasing lithium may include a spinel type lithium titanate, a monoclinic system titanium dioxide and the like. The kind of the negative electrode active material as used can be one kind or two or more kinds. Since a spinel type lithium titanate provides high flatness to a charge-discharge curve, when it is combined with a positive electrode containing the above-mentioned composite oxide, the potentials of the positive and negative electrodes can be controlled easily. Furthermore, the spinel type lithium titanate can minimize potential variations due to progression of cycles and realize high cycle properties.

A substance having electron conductivity such as carbon materials and metals can be used for the conductive material. Forms of a powder, a fibrous powder and the like are desirable.

As the binder, polytetrafluoroethylene (PTFE), polyvinylidene fluoride (PVdF), styrene-butadiene rubber, carboxymethyl cellulose (CMC) or the like can be used.

As the current collector, metal foils, thin plates or meshes, metal meshes or the like can be used. Examples of the current collector material may include copper, stainless, nickel, aluminum and the like.

In the case when the negative electrode material layer contains the negative electrode active material, conductive material and binder, the mix ratios of the negative electrode active material, conductive material and binder are preferably adjusted to 73 to 96% by weight of the negative electrode active material, 2 to 20% by weight of the conductive material and 2 to 7% by weight of the binder, with respect to 100% by weight of the negative electrode material layer.

Furthermore, it is desirable that the negative electrode is used so that the lowest potential during charging becomes 1.0 V (vs. Li/Li$^+$) or more. By doing so, the side reactions between the negative electrode and sulfone-based compounds can be suppressed. By adjusting the lowest potential during charging to the range of 1.0 to 1.5 V (vs. Li/Li$^+$), side reactions in which the electrolyte in the cell is involved can be minimized, thereby a high charge-discharge efficiency and cycle performance can be realized. Specifically, it is more desirable to use the negative electrode so that the lowest potential during charging becomes the range of 1.35 to 1.45 V (vs. Li/Li$^+$) since deterioration of the negative electrode active material during cycles can further be decreased and increase in impedance can be suppressed. Furthermore, it is more desirable to use the negative electrode so that the maximum potential during discharging becomes the range of 1.6 to 2.0 V (vs. Li/Li$^+$) since deterioration of the negative electrode active material during cycles can further be decreased. Examples of the negative electrode active material that can be operated under such potential may include a spinel type lithium titanate, a monoclinic system titanium dioxide and the like.

(Separator)

A nonwoven fabric separator is impregnated with the nonaqueous electrolyte. Examples of the nonwoven fabric may include cellulose nonwoven fabrics, polyethylene telephthalate nonwoven fabrics and polyolefin nonwoven fabrics. A nonwoven fabric formed of at least one of cellulose and a polyolefin is desirable since it has oxidation resistance on the surface at which the positive electrode is contacted. However, a film made of glass fibers which is generally classified into a glass filter has a large glass fiber diameter and causes short-circuit unless the film thickness is increased, and thus it can be used for a test in a laboratory but cannot be used in an actual battery since the battery capacity is impaired. In addition, there is also a problem that, when glass is present on the surface of an electrode, the decomposition of fluorine-containing anions is promoted and decrease in the properties is caused.

For example, in porous films such as polyolefin porous films, pores are formed by making cracks by stretching. Therefore, most of the pores are formed in the direction vertical to the surface of the porous film. The direction vertical to the surface of the porous film (the surface of the separator) is a direction to which the positive and negative electrodes are opposed and ions transfer. However, since gas generated on the surface of the electrodes readily retains in pores that are in parallel to this vertical direction, diffusion of the gas out of the electrode group is disrupted. On the other hand, since a nonwoven fabric is obtained by laminating and integrating fine fibers, voids are extended in all directions, and there are paths through which gas goes in the direction in parallel to the electrodes, i.e., paths through which gas goes in the direction in parallel to the surface of the separator. Therefore, generation of gas is suppressed by the nonaqueous electrolyte and the generated gas diffuses quickly out of the electrode group, and thus excellent rate properties and cycle performance, and a large charge capacity can be obtained.

The thickness of the separator can be 8 μm or more and 40 μm or less.

(Nonaqueous Electrolyte)

The nonaqueous electrolyte comprises a nonaqueous solvent and a lithium salt that is dissolved in the nonaqueous solvent. The nonaqueous solvent contains an asymmetric sulfone-based compound represented by the formula 1 and a symmetric sulfone-based compound represented by the formula 2.

Formula 1 wherein $R_1 \neq R_2$, and $R_1$ and $R_2$ are each an alkyl group having 1 or more and 10 or less carbon atoms, and Formula 2

$R_3$ is an alkyl group having 1 or more and 6 or less carbon atoms.

Examples of the alkyl group having 1 to 10 carbon atoms to be $R_1$ and $R_2$ in the formula 1 may include a methyl group, an ethyl group, a butyl group and an isopropyl group. For the asymmetric sulfone-based compound, isopropyl methyl sulfone (abbreviation: IPMS) in which $R_1$ is a methyl group and $R_2$ is an isopropyl group, ethyl isopropyl sulfone (abbreviation: EIPS) in which $R_1$ is an ethyl group and $R_2$ is an isopropyl group, and the like are desirable since they have a low melting point and a low molecular weight. In addition, n-butyl-n-propyl sulfone, ethyl-n-propyl sulfone and the like are desirable since they have a low melting point.

Examples of the alkyl group having 1 to 6 carbon atoms to be $R_3$ in the formula 2 may include a methyl group, an ethyl group, a butyl group, an isopropyl group and the like. It is desirable that the symmetric sulfone-based compound has a smaller molecular weight than that of the asymmetric sulfone-based compound since the rate of the sulfone group that has polarity can be increased.

It is desirable that the symmetric sulfone-based compound has a melting point of 100° C. or less since the mixed solvent can retain a liquid state in a wide temperature range to prevent a precipitate. In addition, if the melting point is 100° C. or less, the symmetric sulfone-based compound can be formed into a liquid state by heating in a water bath, which makes a process for improving purity and a process for the preparation of the mixed solvent easy. The effect that excellent rate properties and cycle properties and a large charge capacity can be obtained becomes more significant at a high temperature area at about 45 to 60° C. than at a room temperature. A more preferable range of the melting point is the range of 25 to 100° C. The melting point of the symmetric sulfone-based compound is about 108° C. when $R_3$ is a methyl group, about 73° C. when the group is an ethyl group, about 29.5° C. when the group is an n-propyl group, and about 44° C. when the group is an n-butyl group.

It is desirable that the molecular weight of the symmetric sulfone-based compound is lower than the molecular weight of the asymmetric sulfone-based compound, since a symmetric sulfone-based compound that is more inexpensive and has a larger sulfone group content rate in the molecule can be used. As mentioned above, by increasing the rate of the sulfone group that has polarity against the alkyl group that is nonpolar, the oxidation resistance of the nonaqueous solvent can further be increased, and the output properties at a room temperature and at a high temperature of about 60° C. can further be increased. Furthermore, since the symmetric sulfone-based compound is more inexpensive than the asymmetric sulfone-based compound due to its symmetric property, the output properties can be improved at low costs by adjusting the molecular weight as mentioned above.

It is desirable to mix the symmetric sulfone-based compound by an amount by mole that is equal to or more than the amount by mole of the lithium salt dissolved in the solvent so that the symmetric sulfone-based compound can sufficiently contribute to the dissociation of the lithium salt. On the other hand, since the symmetric sulfone-based compound that has a lower molecular weight than that of the asymmetric sulfone-based compound is a solid at a room temperature (25° C.), it is desirable that the symmetric sulfone-based compound does not precipitate or deposit in the mixed solvent. For the above-mentioned reasons, it is desirable that the symmetric sulfone-based compound is dissolved in the asymmetric sulfone-based compound in an amount that is equal to or less than a saturation dissolution amount at a room temperature. However, if no deposition is observed after dissolution of the lithium salt, the symmetric sulfone-based compound can be used even if it is in an amount that exceeds a saturation dissolution amount at a room temperature with respect to the asymmetric sulfone-based compound. In this case, it is possible that precipitation of the symmetric sulfone-based compound occurs in the case when the lithium salt is decreased by the reaction in the battery. In addition, in the case when the battery is mainly used at a room temperature or more, the symmetric sulfone-based compound can be used if it is in an amount that is equal to or less than a saturation dissolution amount at an assumed temperature for use.

Each of the symmetric sulfone-based compound and asymmetric sulfone-based compound is not necessarily limited to one kind, and two or more kinds can be used for each.

In a way other than those mentioned above, it is also possible to decrease the viscosity, improve the solubility of the lithium salt and decrease the melting point by mixing various solvents. However, in order to minimize the effect of the oxidative decomposition of the solvents other than the sulfone-based compounds, it is desirable that the amount of mixing is 10% by weight or less of the solvent. As the above-mentioned various solvents, ethylene carbonate (EC), propylene carbonate (PC), dimethyl carbonate (DMC), methyl ethyl carbonate (MEC), diethyl carbonate (DEC), γ-butyrolactone acetonitrile (AN), ethyl acetate (EA), toluene, xylene or methyl acetate (MA), or the like can be used. The kind of the solvent as used can be one kind or two or more kinds. In order to compensate for the low solubility of the lithium salt in the sulfone-based compounds, cyclic carbonates such as EC and PC that have a high dielectric constant and in which the solubility of the lithium salt is high are desirable. Furthermore, from the viewpoint of suppression of generation of gas, cyclic carbonates such as EC and PC are more desirable than chain carbonates such as DMC, DEC and MEC.

As the lithium salt, lithium perchlorate ($LiCO_4$), lithium hexafluorophosphate ($LiPF_6$), lithium tetrafluoroarsenic ($LiBF_4$), lithium trifluoromethylsulfonate, lithium bis(trifluoromethylsulfonyl)imide (LiTFSI), lithium bispentafluoroethylsulfonylimide or the like can be used. $LiPF_6$ or $LiBF_4$ is desirable since longer cycle properties can be obtained, and a mixed salt thereof may also be used.

(Case)

Examples of the case include cans made of a metals or resin, containers made of a laminate film, rectangular containers comprising a plastic, a ceramic or the like, and the like. As the metal can, a rectangular container of aluminum, iron, stainless or the like can be used. A case made of a laminate film can be obtained, for example, by forming a laminate film material comprising a metal layer of aluminum, copper, stainless or the like and a resin layer into a saclike form by heat sealing. The case made of a laminate film is specifically desirable since generation of gas in the cell can be detected as a change in the appearance of the battery.

Figure 1:
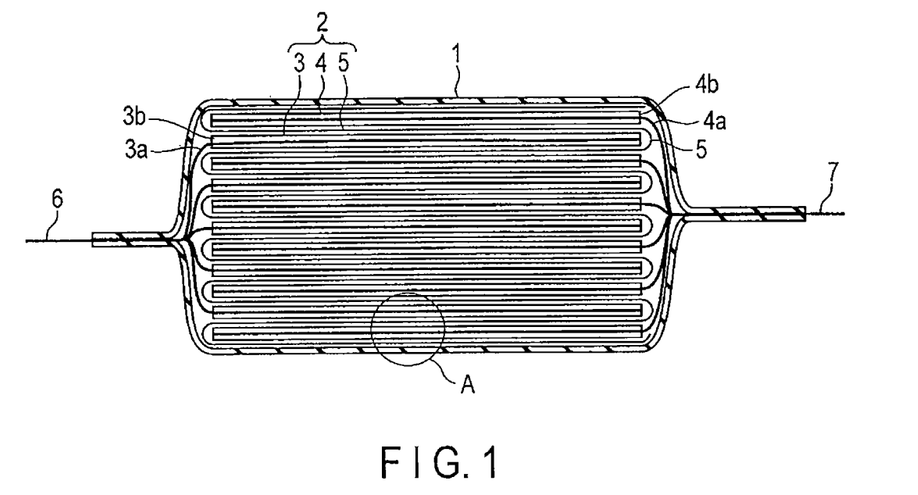
FIG. 1 is a schematic view showing the cross-sectional surface of the nonaqueous electrolyte battery according to the first embodiment.
Figure 2:
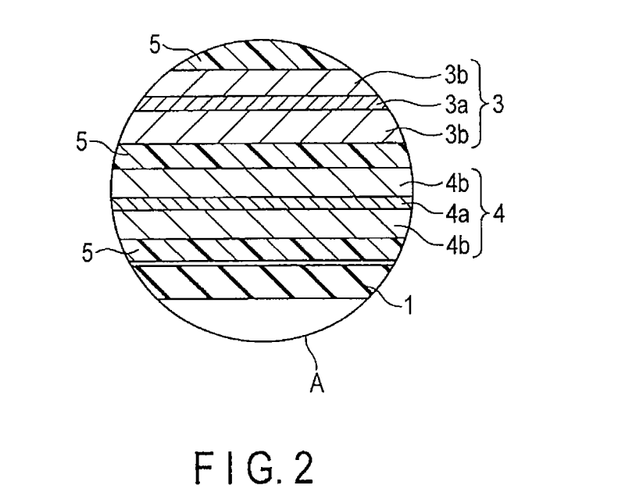
FIG. 2 is an enlarged sectional view of the portion A in FIG. 1.

An example of the nonaqueous electrolyte secondary battery according to the first embodiment is shown in FIG. 1 and FIG. 2. FIG. 1 is a drawing that schematically shows a cross-sectional surface obtained by cutting a flat type nonaqueous electrolyte secondary battery in the direction of the thickness of the battery, and FIG. 2 is an enlarged sectional view showing the portion A in FIG. 1. The nonaqueous electrolyte secondary battery comprises a case 1 made of a laminate film, an electrode group 2 housed in the case 1, and a nonaqueous electrolyte (not depicted). The case 1 made of a laminate film is obtained by forming a laminate film comprising a metal layer and a resin layer into a saclike form by heat sealing. The electrode group 2 is obtained by stacking sets of a positive electrode 3 and a negative electrode 4 and a separator 5 interposed therebetween. The positive electrode 3 comprises a positive electrode current collector 3a and positive electrode material layer(s) 3b that is/are formed at both sides or one side of the positive electrode current collector 3a. The negative electrode 4 comprises a negative electrode current collector 4a and negative electrode material layer(s) 4b that is/are formed at both sides or one side of the negative electrode current collector 4a. A band-like positive electrode terminal 6 is electrically connected to the positive electrode current collector 3a of the positive electrode 3, and the tip thereof is extended to outside through the heat sealed portion of the case 1. On the other hand, a band-like negative electrode terminal 7 is electrically connected to the negative electrode current collector 4a of the negative electrode 4, and the tip thereof is extended to outside through the heat sealed portion of the case 1.

The positive electrode terminal is electrically connected to the positive electrode, and has a function to electrically bridge the outside of the battery and the positive electrode. The form of the positive electrode terminal is not limited to the band-like form as shown in FIG. 1, and can also be, for example, a ribbon-like shape or a rod-like shape. Furthermore, a part of the positive electrode current collector may be used or a member that is different from the positive electrode current collector may be used for the positive electrode terminal. The positive electrode terminal can be formed from, for example, aluminum, an aluminum alloy, titanium or the like.

The negative electrode terminal is electrically connected to the negative electrode, and has a function to electrically bridge the outside of the battery and the negative electrode. The form of the negative electrode terminal is not limited to the band-like form as shown in FIG. 1, and can also be, for example, a ribbon-like shape or a rod-like shape. Furthermore, a part of the negative electrode current collector may be used or a member that is different from the negative electrode current collector may be used for the negative electrode terminal. The negative electrode terminal can be formed from, for example, aluminum, an aluminum alloy, copper, stainless or the like. Aluminum and aluminum alloys are desirable since they have a light weight and excellent weld-connecting property.

Although a nonaqueous electrolyte battery comprising a stacking electrode group and a case made of a laminate film is shown in FIG. 1 and FIG. 2, the shape of the electrode group and the kind of the case in the nonaqueous electrolyte battery are not limited to those shown in the drawings, and any shape and kind can be used as long as they can be used for a nonaqueous electrolyte battery. For example, it is possible to use a wound type electrode group or to use a metal can for the case.

According to the first embodiment, since the nonaqueous electrolyte comprising the nonaqueous solvent containing the asymmetric sulfone-based compound represented by the formula 1 and the symmetric sulfone-based compound represented by the formula 2 and the nonwoven fabric separator are used, the output properties such as rate properties of the nonaqueous electrolyte battery comprising the positive electrode comprising the composite oxide represented by $Li_{1-x}Mn_{1.5-y}Ni_{0.5-z}M_{y+z}O_4$ ($0 \leq x \leq 1$, $0 \leq y+z \leq 0.15$, and M is at least one kind of element selected from the group consisting of Mg, Al, Ti, Fe, Co, Ni, Cu, Zn, Ga, Nb, Sn, Zr and Ta) and the negative electrode comprising the Ti-containing oxide which is capable of absorbing and releasing lithium can be improved. Since the positive electrode can adjust the maximum potential during charging to a high potential of from 4.4 to 4.9 V (vs. $Li/Li^+$), it is possible to realize a 3 V nonaqueous electrolyte battery by combining the positive electrode with the negative electrode. Therefore, according to the first embodiment, the output properties of the 3 V nonaqueous electrolyte battery can be improved.

Second Embodiment

The battery pack according to the second embodiment has one or a plurality of nonaqueous electrolyte secondary battery (batteries) (unit cell(s)) of the first embodiment. When a plurality of unit cells are included, the unit cells are electrically connected in series or in parallel.

Such battery pack will be explained in detail with referring to FIG. 3 and FIG. 4.

As the unit cell, for example, a flat type nonaqueous electrolyte secondary battery can be used. A plurality of unit cells 21 constituted by flat type nonaqueous electrolyte secondary batteries are laminated so that a positive electrode terminal 16 and a negative electrode terminal 17 that are extending outward are aligned in the same direction, and are bound by an adhesive tape 22 to constitute a battery module 23. As shown in FIG. 4, the unit cells 21 are electrically connected in series with one another.

A printed circuit board 24 is disposed opposing to the side surface of the unit cells 21 from which the negative electrode terminal 17 and positive electrode terminal 16 are extended. As shown in FIG. 4, a thermistor 25, a protective circuit 26, and a terminal 27 for carrying a current to an external device are mounted on the printed circuit board 24. In addition, an insulating board (not shown) is attached to the surface of the protective circuit substrate 24, which faces the battery module 23, so as to avoid unnecessary connection with the conductors of the battery module 23.

A positive electrode lead 28 is connected to the positive electrode terminal 16 that is positioned at the lowermost layer of the battery module 23, and the tip thereof is inserted to and electrically connected to a positive electrode connector 29 of the printed circuit board 24. A negative electrode lead 30 is connected to the negative electrode terminal 17 that is positioned at the uppermost layer of the battery module 23, and the tip thereof is inserted to and electrically connected to a negative electrode connector 31 of the printed circuit board 24. These connectors 29 and 31 are connected to a protective circuit 26 via wirings 32 and 33 that are formed on the printed circuit board 24.

The thermistor 25 detects the temperature of the unit cells 21, and the detection signal thereof is sent to the protective circuit 26. The protective circuit 26 may break a positive conductor 34a and a negative conductor 34b between the protective circuit 26 and the terminal 27 for carrying a current to an external device, under a predetermined condition. The predetermined condition refers to, for example, the time at which the detection temperature of the thermistor 25 reaches a predetermined temperature or more. Furthermore, the predetermined condition refers to the time at which over-charge, over-discharge, over-current or the like of the unit cells 21 are detected. The detection of over-charge or the like is performed in the individual unit cells 21 or the battery module 23. When detection is performed in the individual unit cell 21, a battery voltage may be detected, or a positive electrode potential or negative electrode potential may be detected. In the latter case, a lithium electrode that is used as a reference electrode is inserted in the individual unit cell 21. In the case of FIGS. 3 and 4, conductors 35 for detection of a voltage are connected to the respective unit cells 21, and detection signals are sent to the protective circuit 26 via the conductors 35.

Protective sheets 36 made of a rubber or resin are disposed respectively on the three side surfaces of the battery module 23 except for the side surface from which the positive electrode terminal 16 and negative electrode terminal 17 protrude.

The battery module 23 is housed in a housing container 37 together with the respective protective sheets 36 and the printed circuit board 24. Namely, the protective sheets 36 are disposed respectively on the both inner surfaces in the longitudinal side direction and the inner surface in the short side direction of the housing container 37, and the printed circuit board 24 is disposed on the inner surface on the opposite side in the short side direction. The battery module 23 is positioned in a space surrounded by the protective sheets 36 and the printed circuit board 24. A lid 38 is attached to the upper surface of the housing container 37.

Alternatively, the battery module 23 may be fixed by using a heat shrink tape instead of the adhesive tape 22. In this case, the protective sheets are disposed on both side surfaces of the battery module, the battery module is wound around a heat shrink tube, and the heat shrink tube is shrank by heating to bind the battery module.

Figure 3:
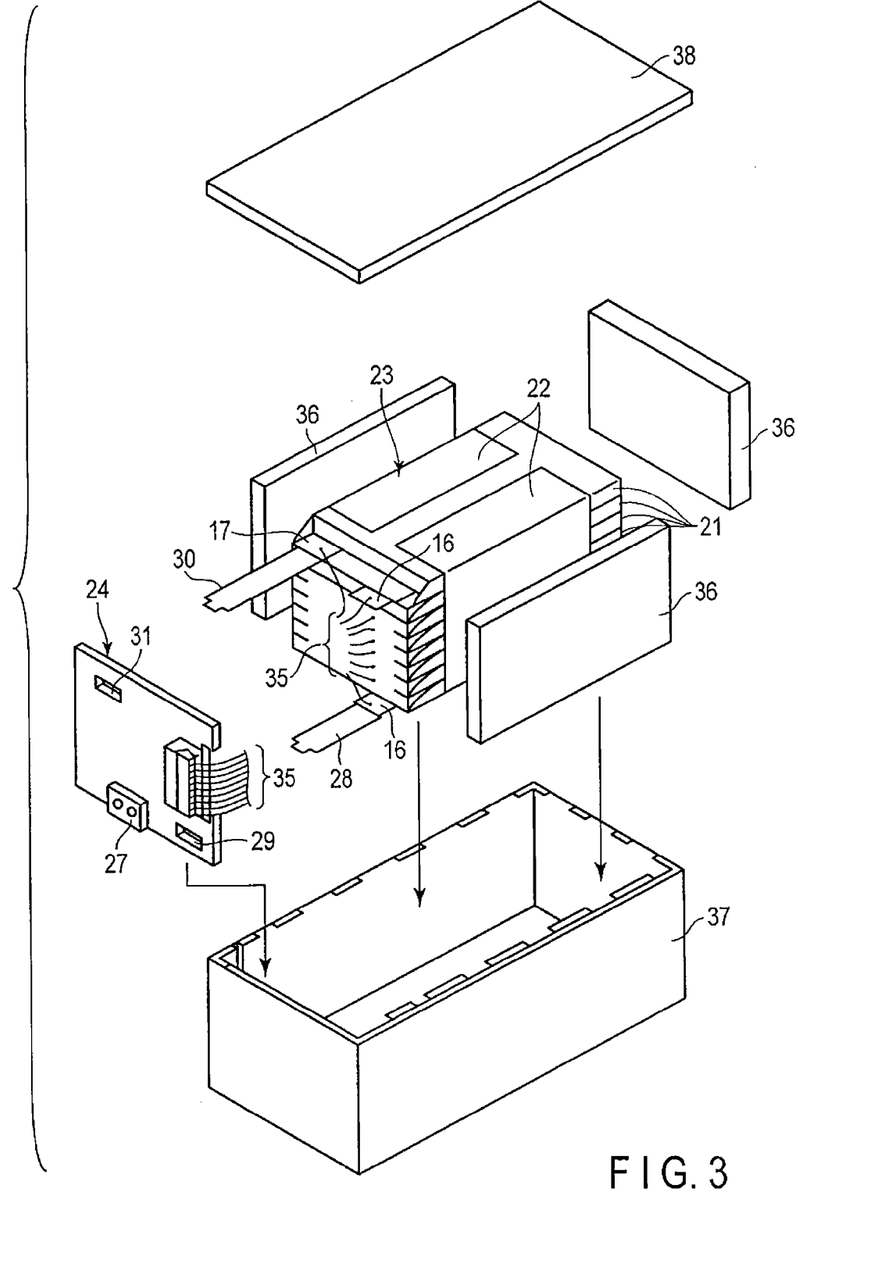
FIG. 3 is an exploded perspective view of the battery pack according to the second embodiment.
Figure 4:
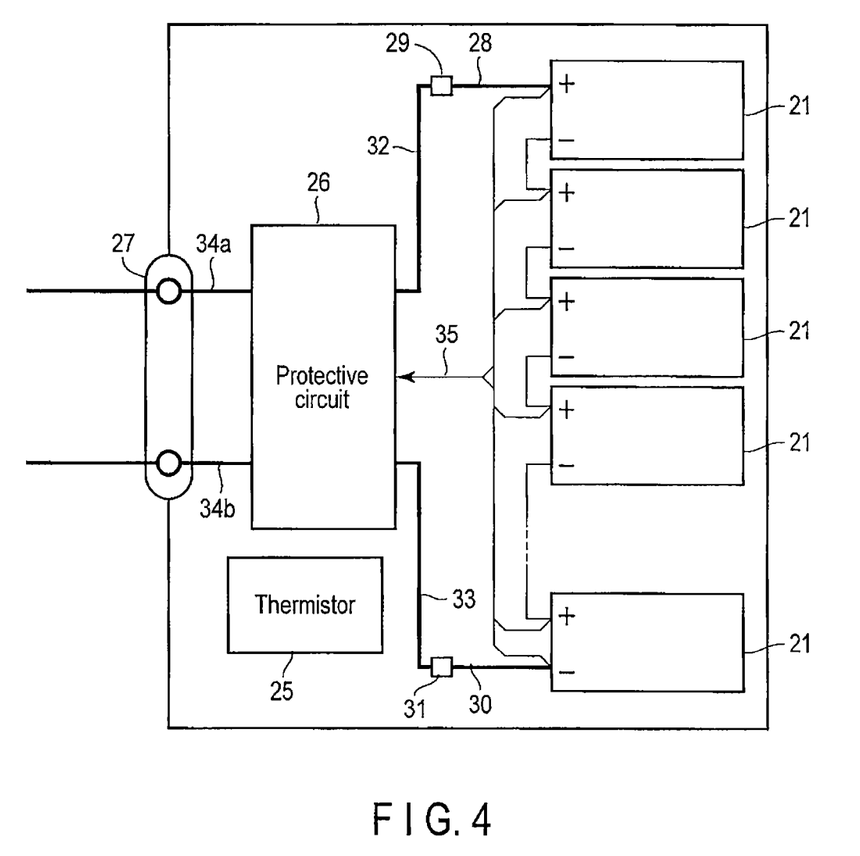
FIG. 4 is a block diagram showing the electric circuit of the battery pack of FIG. 3.

Although an embodiment in which the unit cells 21 are connected with each other in series is shown in FIGS. 3 and 4, the unit cells may be connected with each other in parallel so as to increase a battery capacity. Alternatively, assembled battery packs may be connected with each other in series or parallel.

Furthermore, the embodiment of the battery pack is suitably changed according to use. Preferable use of the battery pack is one for which cycle performance at high rate is desired. Specific examples may include uses in power sources for digital cameras, and in-car uses in two to four-wheeled hybrid battery automobiles, two to four-wheeled battery automobiles, motor assisted bicycles and the like. In-car uses are preferable.

According to the second embodiment, since the battery pack comprises the nonaqueous electrolyte battery according to the first embodiment, a battery pack using a 3 V nonaqueous electrolyte battery having improved output properties such as rate properties can be realized.

EXAMPLES

Hereinafter Examples will be explained in detail by using the drawings and tables. First, the nonaqueous electrolyte battery used in Examples will be explained with referring to FIG. 5.

Figure 5:
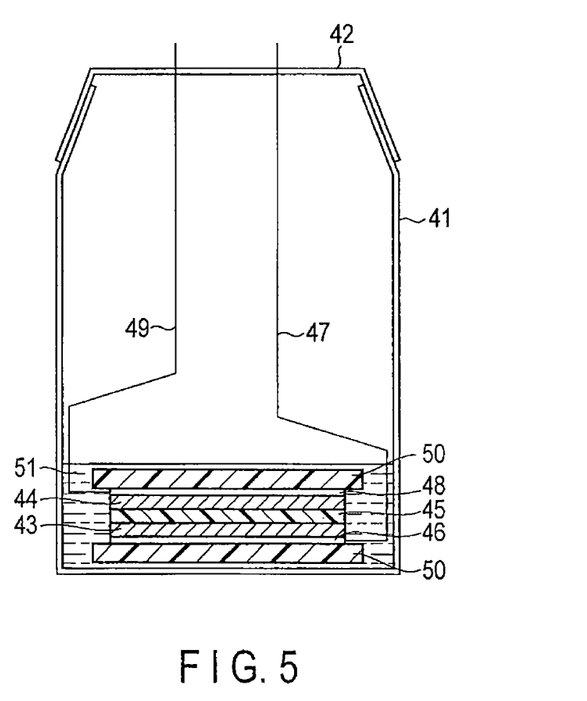
FIG. 5 is a schematic view of the cross-sectional surface of the nonaqueous electrolyte battery of Examples.

As shown in FIG. 5, the nonaqueous electrolyte battery of Examples uses a glass container 41 as a case and a glass lid 42 disposed on the opening of the glass container 41. The electrode group is a laminate in which a positive electrode 43, a negative electrode 44, and a separator 45 disposed between the positive electrode 43 and negative electrode 44 are laminated. A positive electrode current collector plate 46 made of titanium is laminated on the positive electrode 43. A titanium wire 47 is connected to the positive electrode current collector plate 46. A negative electrode current collector plate 48 made of nickel is laminated on the negative electrode 44. A nickel wire 49 is connected to the negative electrode current collector plate 48. Resin presser plates 50 are disposed on the both outermost layers of the electrode group, and the electrode group is interposed between the resin presser plates 50. The tips of the titanium wire 47 and nickel wire 49 are extended to outside through the glass lid 42. A nonaqueous electrolyte 51 is housed in the glass container 41, and the electrode group is immersed in the nonaqueous electrolyte 51.

Example 1

90% by weight of a powder of $LiMn_{1.5}Ni_{0.5}O_4$ as a positive electrode active material, 2% by weight of acetylene black, 5% by weight of graphite, and 5% by weight of polyvinylidene fluoride as a binder were formed into a slurry by using N-methylpyrrolidone as a solvent. The slurry was applied to the both surfaces of an aluminum foil having a thickness of 15 μm, dried and pressed. Thereafter one surface was peeled off to expose the aluminum foil, and the aluminum foil was cut into a 20 mm square to prepare a positive electrode sheet 43 of 20 mm square.

90% by weight of a powder of $Li_4Ti_5O_{12}$ as a negative electrode active material, 5% by weight of graphite as a conductive material, and 5% by weight of polyvinylidene fluoride (PVdF) were added to a solution of N-methylpyrrolidone (NMP) and mixed to prepare a slurry, and the obtained slurry was applied to the both surfaces of an aluminum foil having a thickness of 25 μm, dried and pressed. Thereafter one surface was peeled off to expose the aluminum foil, and the aluminum foil was cut into a 20 mm square to prepare a negative electrode sheet 44 of 20 mm square.

As a separator 45, a cellulose nonwoven fabric of 25 mm square having a thickness of 20 μm was used.

A positive electrode current collector 46 to which a titanium wire 47 had been connected, the positive electrode 43, the separator 45, the negative electrode 44, and a negative electrode current collector 48 to which a nickel wire 49 had been connected were laminated in this order, and the upper and bottom surfaces of the obtained laminate were pressed by presser plates 50 to prepare an electrode group. The electrode group was housed in a glass container 41 in an argon glovebox.

Ethyl isopropyl sulfone (abbreviation: SIPS) that is an asymmetric sulfone-based compound having a melting point of −6° C. and dipropyl sulfone (abbreviation: DPS) that is a symmetric sulfone-based compound having a melting point of 29.5° C. that is a room temperature or more were mixed at a weight ratio of 1:1. This mixed solution was a liquid at a room temperature. Furthermore, the symmetric sulfone-based compound was dissolved in the asymmetric sulfone-based compound in an amount that is equal to or less than a saturation dissolution amount at a room temperature. A nonaqueous electrolyte 51 was prepared by dissolving 1 M of LiBF$_4$ in the mixed solution. The molar ratio of the lithium salt (LiBF$_4$), EIPS and DPS was 1:3.8:3.3. The nonaqueous electrolyte 51 was poured into the glass container 41, and the glass container 41 was sealed with the glass lid 42 to give a nonaqueous electrolyte battery shown in FIG. 5.

Example 2

Ethyl isopropyl sulfone (abbreviation: EIPS) that is an asymmetric sulfone-based compound and dibutyl sulfone (abbreviation: DBS) that is a symmetric sulfone-based compound having a melting point of 44° C. that is not less than a room temperature were mixed at a weight ratio of EIPS:DBS=1:1. This mixed solution was a liquid at a room temperature. Furthermore, the symmetric sulfone-based compound was dissolved in the asymmetric sulfone-based compound in an amount that is equal to or less than a saturation dissolution amount at a room temperature. A nonaqueous electrolyte was prepared in a similar manner to Example 1, except that the obtained mixed solution was used. The molar ratio of the lithium salt (LiBF$_4$), EIPS and DBS was 1:3.8:2.7. A nonaqueous electrolyte battery was prepared in a similar manner to Example 1, except that the obtained nonaqueous electrolyte was used.

Comparative Example 1

A nonaqueous electrolyte battery was prepared in a similar manner to Example 1, except that a polypropylene porous film having a thickness of 12 µm was used as a separator.

The obtained nonaqueous electrolyte batteries of Examples and Comparative Example were each charged under a 25° C. circumstance at a constant current of 0.32 mA and a constant voltage of 3.25 V up to 15 hours, and discharged at 0.32 mA up to 2.7 V. Thereafter the charging was stopped at the time when the charging current reached 0.08 mA at a constant current of 0.64 mA and a constant voltage of 3.25 V. The battery was discharged at 0.32 mA up to 2.7 V. Thereafter the battery was charged in a similar manner, and discharging was conducted at 0.64 mA, 1.6 mA and 3.2 mA.

Thereafter the battery was charged in a similar manner at 25° C., and a similar test in which the discharging current was changed was conducted under a 0° C. circumstance.

Figure 6:
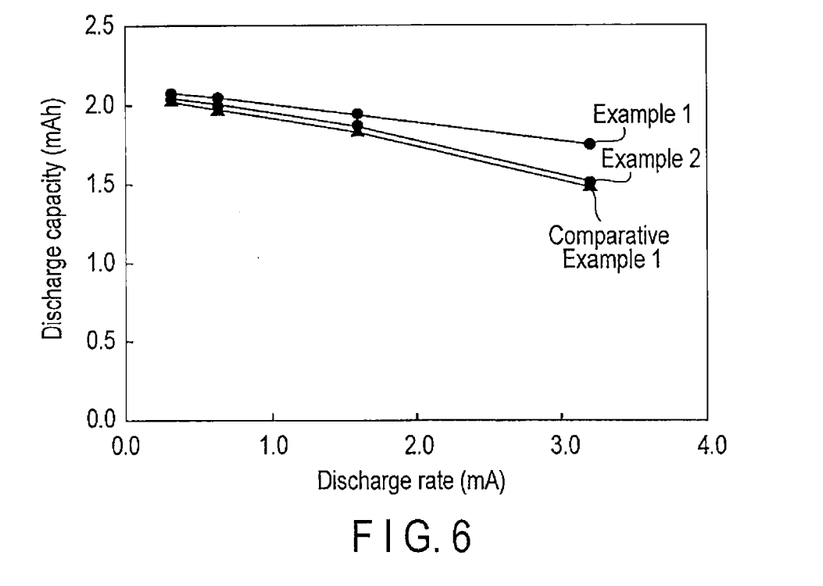
FIG. 6 is a graph showing the discharge rate properties of the nonaqueous electrolyte batteries of Examples and Comparative Example.

It is understood from FIG. 6 that shows the results of the above-mentioned evaluations at a room temperature (25° C.) that higher rate properties can be obtained in Example 1 as compared to Comparative Example 1. It is understood that properties that are equal to or higher than those in Comparative Example 1 in which DPS was used could be obtained even in the case when DBS having a higher viscosity was used (Example 2). It is expected that poorer properties than those in Comparative Example 1 are obtained in the case when a similar separator to that in Comparative Example 1 is used and DBS is used, and thus it can be said that high properties could be obtained as in the case of DPS by the combination of the nonwoven fabric separator and the mixed solvent of the sulfone compounds also in the case when DBS was used as the symmetric sulfone.

Figure 7:
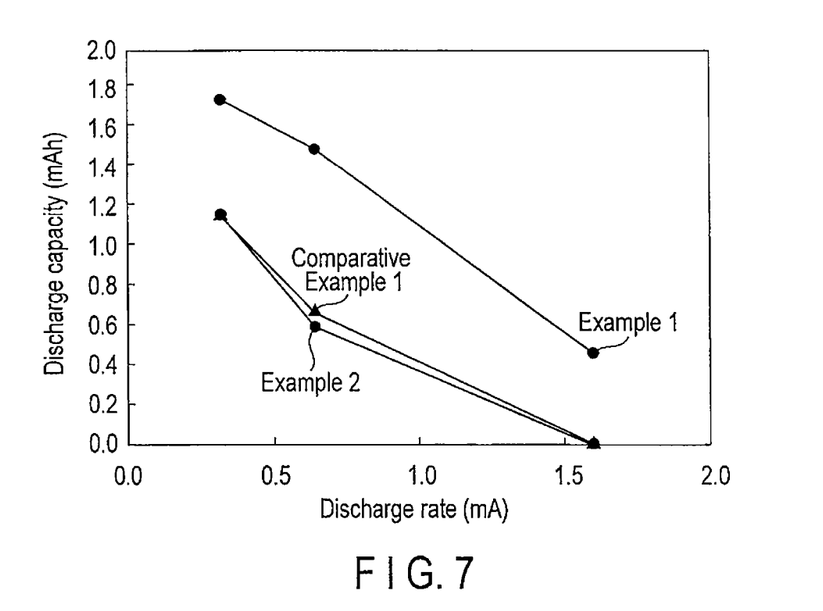
FIG. 7 is a graph showing the discharge rate properties of the nonaqueous electrolyte batteries of Examples and Comparative Example.

Furthermore, as shown in FIG. 7, it was found that the difference became significant at a low temperature (0° C.), Example 1 showed significantly higher properties than those in Comparative Example 1, and Example 2 in which DBS was used could provide an approximately similar result to that in Comparative Example 1 in which DPS was used. Furthermore, isopropyl methyl sulfone (abbreviation: IPMS) has a structure that is extremely close to that of EIPS and can provide an approximately similar level of ionic conductivity. Therefore, an approximately similar result to that in Example in which EIPS was used can be obtained even in the case when isopropyl methyl sulfone (abbreviation: IPMS) is used instead of LIPS and a symmetric sulfone-based compound such as DPS and DBS is dissolved in IPMS. Specifically, it is considered in view of the temperature dependency of ionic conductivity that a higher effect than that of EIPS can be obtained at a room temperature or more.

According to the nonaqueous electrolyte battery of at least one embodiment mentioned above, since the nonaqueous electrolyte comprising the nonaqueous solvent containing the asymmetric sulfone-based compound represented by the formula 1 and the symmetric sulfone-based compound represented by the formula 2 and the nonwoven fabric separator are used, the rate properties can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a nonaqueous electrolyte comprising a nonaqueous solvent comprising an asymmetric sulfone-based compound represented by Formula 1 and a symmetric sulfone-based compound represented by Formula 2, and a lithium salt which is dissolved in the nonaqueous solvent;
a positive electrode comprising a positive electrode active material comprising a composite oxide represented by $Li_{1-x}Mn_{1.5-y}Ni_{0.5-z}M_{y+z}O_4$ (0≤x≤1, 0≤y+z≤0.15, and M is at least one kind of element selected from the group consisting of Mg, Al, Ti, Fe, Co, Ni, Cu, Zn, Ga, Nb, Sn, Zr and Ta);
a negative electrode comprising a negative electrode active material comprising at least one of a spinel type lithium titanate and a monoclinic system titanium dioxide; and
a separator comprising a nonwoven fabric which is provided between the positive electrode and the negative electrode Formula 1

Formula 2 wherein $R_1 \ne R_2$, and $R_1$ and $R_2$ are each an alkyl group having 1 to 10 carbon atoms, and $R_3$ is an alkyl group having 1 to 6 carbon atoms.

2. The battery according to claim 1,
wherein the symmetric sulfone-based compound has a melting point of from 25 to 100° C.

3. The battery according to claim 1,
wherein the nonwoven fabric comprises at least one of cellulose and a polyolefin.

4. The battery according to claim 1,
wherein an amount by mole of the symmetric sulfone-based compound is equal to or more than an amount by mole of the lithium salt.

5. The battery according to claim 1,
wherein the symmetric sulfone-based compound is a solid at a room temperature, and the symmetric sulfone-based compound is dissolved in the asymmetric sulfone-based compound by an amount that is equal to or less than a saturation dissolution amount at a room temperature.

6. The battery according to claim 1,
wherein the lithium salt comprises at least one of $LiPF_6$ and $LiBF_4$.

7. The battery according to claim 1,
wherein $R_1$ and $R_2$ are each a methyl group, an ethyl group, a butyl group or an isopropyl group, and are different from each other.

8. The battery according to claim 1,
wherein $R_3$ is a methyl group, an ethyl group, a butyl group or an isopropyl group.

9. The battery according to claim 1,
wherein the nonaqueous solvent comprises at least one selected from the group consisting of ethylene carbonate, propylene carbonate, dimethyl carbonate, methyl ethyl carbonate, diethyl carbonate, γ-butyrolactone, acetonitrile, ethyl acetate, toluene, xylene and methyl acetate.

10. A battery pack comprising the battery according to claim 1.

11. The battery according to claim 1,
wherein the negative electrode active material comprises said spinel type lithium titanate.

12. The battery according to claim 11, wherein:
the lithium salt comprises at least one of $LiPF_6$ and $LiBF_4$;
$R_1$ and $R_2$ are each a methyl group, an ethyl group, a butyl group or an isopropyl group, and are different from each other;
$R_3$ is a methyl group, an ethyl group, a butyl group or an isopropyl group; and
the nonaqueous solvent comprises at least one selected from the group consisting of ethylene carbonate, propylene carbonate, dimethyl carbonate, methyl ethyl carbonate, diethyl carbonate, γ-butyrolactone, acetonitrile, ethyl acetate, toluene, xylene and methyl acetate.

13. The battery according to claim 12,
wherein the composite oxide is $LiMn_{1.5}Ni_{0.5}O_4$.

14. The battery according to claim 1,
wherein the symmetric sulfone-based compound has a smaller molecular weight than the asymmetric sulfone-based compound.

15. The battery according to claim 1,
wherein the composite oxide is $LiMn_{1.5}Ni_{0.5}O_4$.

16. The battery according to claim 1, wherein:
the lithium salt comprises at least one of $LiPF_6$ and $LiBF_4$;
$R_1$ and $R_2$ are each a methyl group, an ethyl group, a butyl group or an isopropyl group, and are different from each other;
$R_3$ is a methyl group, an ethyl group, a butyl group or an isopropyl group; and
the nonaqueous solvent comprises at least one selected from the group consisting of ethylene carbonate, propylene carbonate, dimethyl carbonate, methyl ethyl carbonate, diethyl carbonate, γ-butyrolactone, acetonitrile, ethyl acetate, toluene, xylene and methyl acetate.

17. The battery according to claim 1,
wherein the negative electrode active material comprises said monoclinic system titanium dioxide.

18. A nonaqueous electrolyte battery comprising:
a nonaqueous electrolyte comprising a nonaqueous solvent comprising an asymmetric sulfone-based compound represented by Formula 1 and a symmetric sulfone-based compound represented by Formula 2, and a lithium salt which is dissolved in the nonaqueous solvent;
a positive electrode comprising a positive electrode active material comprising a composite oxide represented by $Li_{1-x}Mn_{1.5-y}Ni_{0.5-z}M_{y+z}O_4$ (0≤x≤1, 0≤y+z≤0.15, and M is at least one kind of element selected from the group consisting of Mg, Al, Ti, Fe, Co, Ni, Cu, Zn, Ga, Nb, Sn, Zr and Ta);
a negative electrode comprising a negative electrode active material comprising a Ti-containing oxide which is capable of absorbing and releasing lithium; and
a separator comprising a nonwoven fabric which is provided between the positive electrode and the negative electrode Formula 1

Formula 2 wherein $R_1 \neq R_2$, and $R_1$ and $R_2$ are each an alkyl group having 1 to 10 carbon atoms, and $R_3$ is an alkyl group having 1 to 6 carbon atoms, and
wherein the symmetric sulfone-based compound has a smaller molecular weight than the asymmetric sulfone-based compound.

* * * * *